June 14, 1949.  L. RUBEN ET AL  2,473,222
CHORD INDICATOR
Filed May 18, 1948
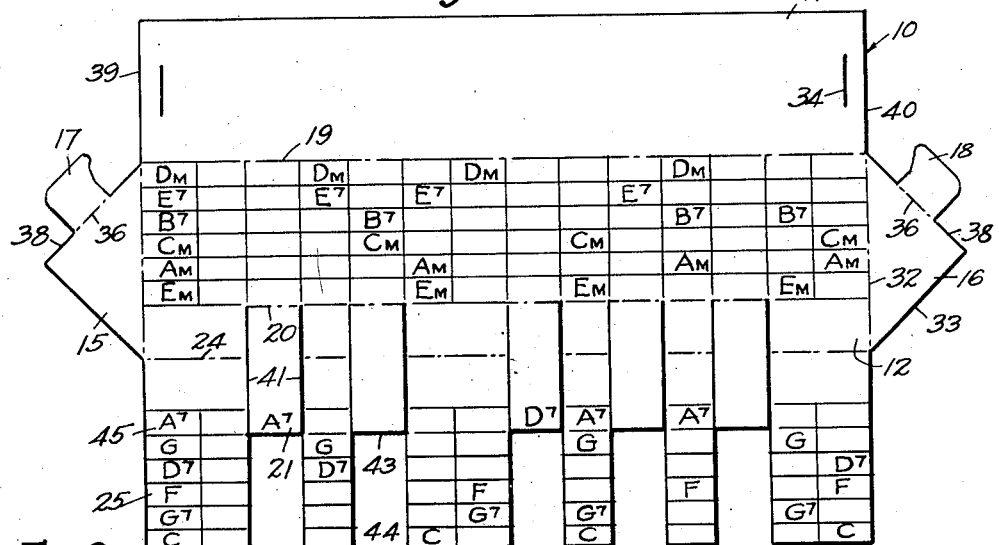
Fig. 1
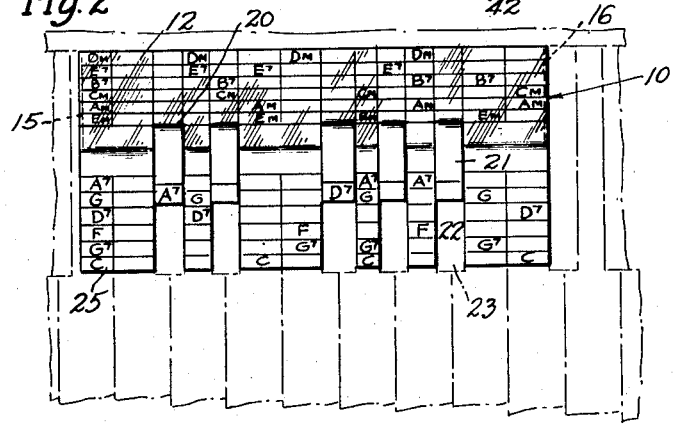
Fig. 2
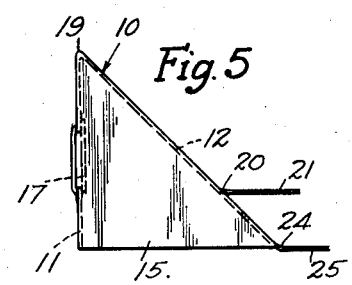
Fig. 5
Fig. 3
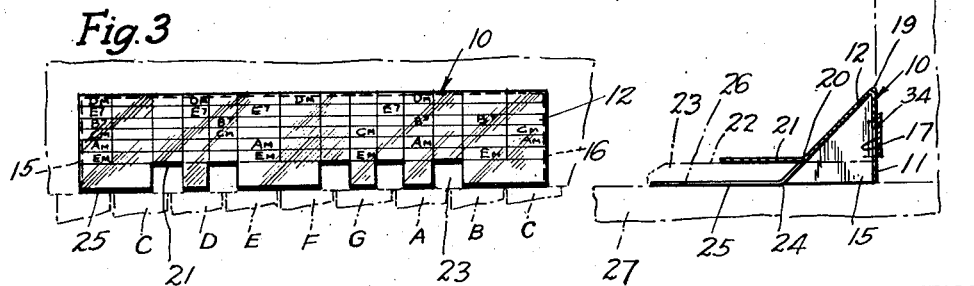
Fig. 4
INVENTORS
Louis Ruben
BY E. Jack Zeik
ATTORNEY Patented June 14, 1949

2,473,222

UNITED STATES PATENT OFFICE 2,473,222

CHORD INDICATOR

Louis Ruben and E. Jack Zeik, Bayonne, N. J., assignors to Leonard Greene, New York, N. Y.

Application May 18, 1948, Serial No. 27,753

7 Claims. (Cl. 84—471)

This invention relates to aids in the teaching of piano playing and particularly to devices constructed and marked to indicate the notes comprising certain chords.

The invention contemplates the provision of an indicator provided with tabs each designed to lie on or project over or otherwise register with or designate a corresponding black or white key of an octave of a standard piano keyboard, each tab being marked with the symbols for the various standard or commonly used musical chords in the sounding of which the key corresponding to that tab is to be struck, whereby an inexperienced player may quickly and easily select and strike the proper combinations of keys required to produce the designated chord.

The invention further contemplates the provision of an indicator designed to be arranged at any full octave of a standard piano keyboard and bearing a list of the most common chord triads, and also locating the keys to be struck to produce any selected chord by means of indicia respectively aligned with the keys and spaced apart longitudinally of the keyboard substantially the same distance as such keys.

The invention further contemplates the provision of a musical chord indicator adapted to be folded and stamped economically of suitable sheet material such as paper, metal, plastic or the like and folded into generally triangular prismatic form and with an indicating tab for each black and white key of a full octave of a standard piano keyboard, the proper chord symbols being aligned with the respective keys to designate the keys producing a given chord.

The invention further contemplates the provision of a chord indicator of simple construction adapted to be readily set into place on a keyboard and as readily removed, and bearing indicia aligned with the piano keys when the indicator is in place to designate the keys to be selected in sounding a given chord, the indicator being so constructed as to avoid interference with normal playing.

The various objects of the invention will be clear from the description which follows and from the drawings, in which Fig. 1 is an elevational view of the one piece printed, cut, slitted and scored blank which need merely be properly folded to form the indicator.

Fig. 2 is a top plan view of the indicator folded from the blank of Fig. 1, and as it appears when in use and fitted to any full octave of a piano keyboard, the rear portion of such keyboard being shown in dash-dot lines.

Fig. 3 is a front elevational view of the indicator showing in dash-dot lines a portion of the keyboard.

Fig. 4 is a combined end elevational view and vertical sectional view of Fig. 3.

Fig. 5 is an end elevational view of the indicator, the front portions of the projecting tabs being omitted.

In the practical embodiment of the invention shown by way of example, the indicator 10 may conveniently be made of a single piece of sheet material such as paper, foldable plastic, metal or the like, blanked out as shown in Fig. 1 to provide the back member or wall 11, the front wall 12, the bottom tabs, the end walls 15 and 16 and the locking tabs 17 and 18. The fold line 19 shown in dash-dot lines in Fig. 1 and indented or scored into the sheet, divides the back 11 from the front 12, while the fold lines 20 intermediate the edges of said front 12 permit the shorter bottom tabs 21 to be folded into a horizontal position or parallel to the upper faces 22 of the usual black keys 23 provided in a standard keyboard. The fold line 20 is interrupted at intervals to permit the surface of the front wall 12 to extend downwardly therepast.

At the lower edge of said wall 12, are provided the fold or score lines 24 forming a set of aligned and longitudinally spaced lines similar to the set of fold lines 20 and arranged alternately therewith. The longer horizontal tabs 25 are folded about the lines 24 into a position parallel to the shorter tabs 21 and at a lower level and are intended to lie on the respective rear portions of the upper faces as 26 of the white keys 27. As best seen in Fig. 4, the upper tabs 21 are shorter than the black keys 23 on which they are intended to rest, thereby to expose the front parts of said keys for access by the fingers of the player as in playing without any indicator. Similarly, the lower and longer tabs 25 are shorter than the white keys and are preferably about the same lengths as the black keys to expose the major parts of the playing surfaces of the white keys.

Suitable preferably triangular end walls as 15, 16 are integrally joined to the edges of the front wall 12 and are folded relatively thereto along the scored fold lines 32, the edges 33 of the end walls forming a support for the indicator and resting on one of the white keys of the keyboard when the indicator is in use. Locking slits as 34 of any well known type are made in the back wall 11 to receive the locking tabs 17 or 18, which are foldable about the fold lines 36 at the edges 37 and 38 into position to arrange the locking tabs substantially parallel to the back 11. Preferably, the free ends of the tabs 17 and 18 are somewhat wider than the slits 34 whereby the locking tabs cannot normally be withdrawn from their slits after passage therethrough, without twisting the tabs. The respective edges 38 and 38 of the end walls 15 and 16 are brought into substantial coincidence with the end edges 39 and 40 of the back 11 when the locking tabs are in the locked positions thereof in the slits, said back then being vertical and the front wall 12 being inclined.

A series of parallel slits or cuts and a series of slots are made in the blank shown in Fig. 1 to separate the indicating tabs 21 and 25 from each other and from the wall 12. The slits 41 therefore extend from the fold lines 20 to the front edge 42 of the blank. Between alternate pairs of adjacent slits, the material of the sheet is severed and removed as at 43 to make the upper tabs 21 shorter than the lower tabs 25 and to form slots as 44 in the sheet. By folding the tabs 21 on the upper fold lines 20 and folding the lower tabs 25 on the lower fold lines 24, the respective sets of tabs are caused to assume horizontal positions at different levels or in different horizontal planes, corresponding to the upper surfaces of the black and white keys of the keyboard.

Preferably, the tabs 25 are ruled to divide them into vertical and horizontal columns, at the proper spaces of which indicia for the more commonly used chords may be imprinted. Similarly, the surface of the front wall 12 may also be divided into such columns and indicia for the lesser used chords imprinted therein. In detail for example, the more commonly used chords as A7, G and the like are preferably printed as a list 45 at the left of the extreme left hand tab 25, the remainder of which terminal tab lies on the first white key, namely, C, of the octave. The G chord comprises the notes or tones D, G and B and hence the letter G is printed in selected vertical columns but at preferably horizontally aligned points on those long tabs 25 lying on the keys for said notes D, G, and B. To strike the G chord, the player merely looks for the G symbols on the indicator, and merely strikes the keys, in this case three white keys, at or below the printed symbol G on the tabs. If any chord includes a black key, whether a sharp or a flat, the chord symbol as A7 or D7 is printed on the corresponding tab 21 lying on or corresponding to the proper black key whereby the spacing between the printed symbols for any chord is substantially the same as the spacing between the keys for that chord on a standard piano keyboard. The rulings on the surface of the front wall 12 similarly provides columns adapted to register with the keys of a full piano octave, the chord symbols for any selected chord being similarly printed in horizontal alignment in the selected vertical columns corresponding or adapted to register with the required keys. For example, when the indicator is in place on the keyboard, the notes or keys D, F and A are below and in transverse alignment with the respective horizontally aligned symbols Dm on the wall 12 as is clearly seen in Figs. 2 and 3.

To mount the indicator in place on the keyboard, the lower edge portion of the vertical back wall 11 is slipped behind the rear ends of the black keys 23, as best seen in Fig. 4, until the lowermost edge rests on the rear parts of the white keys, with the end wall 16 at the left of and alongside the first black key of the next higher octave. The lower edge of said end wall rests on top of the last C key. The other end wall 15 is at the right of the last black key of the next lower octave and rests on the B key of said octave. The tabs 25 rest on the white keys and the tabs 21 on the black keys. The indicator is thereby self retained in position against accidental displacement, while the keys may be played in the usual manner without disturbing the indicator.

It will be seen from the above that we have provided a simple, inexpensive but effective indicator for apprising an inexperienced piano player which keys are to be selected to play any designated chord denoted on sheet music by a symbol, whereby the chord may be quickly selected and played, and the player taught easily how to play all of the various chords. It will also be seen that we have provided a device well designed for the intended purposes and for commercial use. While we have shown and described a certain specific embodiment of the invention, various changes may obviously be made therein without departing from the spirit of the invention defined in the appended claims.

We claim:

1. A musical chord indicator comprising an inclined front wall member, a substantially horizontal bottom member, the bottom member having spaced transverse slots therein extending inwardly from the outer edge thereof, the side edges of the slots continuing as slits into the inclined member, a first set of aligned longitudinally spaced folds at the joint between the bottom member and the inclined member, and an additional set of aligned longitudinally spaced folds alternating with and spaced inwardly from the folds of said first set.

2. The indicator of claim 1, said sets of folds and the slots and slits forming a set of tabs at one level corresponding to the black keys of a standard piano keyboard having black and white keys, and forming a second set of longer tabs at a lower level corresponding to the white keys of said keyboard.

3. The indicator of claim 2, said indicator being of a single sheet of material, a back wall member depending from the upper edge of the inclined member, substantially triangular members extending from the end edges of the inclined member, and cooperating means on the end and back members locking said end and back members together to form a mutilated triangular prism with the tabs extending forwardly therefrom.

4. A musical chord indicator comprising a surface divided into vertical and horizontal columns, indicia constituting chord symbols in selected vertical and horizontal columns, a set of longitudinally spaced tabs extending forwardly from said surface and joined thereto along a line intermediate the longitudinal edges of said surface, a second set of longitudinally spaced tabs extending forwardly from said surface and joined thereto along the lower longitudinal edge thereof, and indicia on said tabs constituting chord symbols arranged to correspond to those keys of a standard piano keyboard to be struck in order to sound the respective chords denoted by said symbols.

5. The indicator of claim 4 and means extending from said surface for supporting the indicator at a full octave on the keyboard and with the tabs substantially resting on the corresponding keys.

6. A musical chord indicator comprising a sheet having folds, slots and slits therein defining a first set of tabs spaced to correspond to the spacing of the black keys of a standard piano keyboard having black keys and white keys, and a second set of tabs spaced to correspond to the spacing of said white keys, and chord symbols on the tabs and on a portion of the sheet which is unmutilated by the slots and slits, said symbols being arranged in transverse alignment with the corresponding respective keys when the indicator is arranged on the keyboard to extend between successive C notes thereof.

7. The indicator of claim 6, the tabs of the first set of tabs alternating with the tabs of the second set of tabs, and means forming a part of the sheet to support the indicator on the keyboard in position to expose the keys thereof for playing purposes.

LOUIS RUBEN.
E. JACK ZEIK.

REFERENCES CITED

The following references are of record in the file of this patent:

UNITED STATES PATENTS

| Number | Name | Date |
| --- | --- | --- |
| 1,725,844 | Barnes | Aug. 27, 1929 |
| 2,028,809 | Shannon | Jan. 28, 1936 |